United States Patent [19]

Martin

[11] Patent Number: 5,437,367
[45] Date of Patent: Aug. 1, 1995

[54] CARRYING CASE FOR ELECTRONIC COMPONENTS

[76] Inventor: Mitchell L. Martin, P.O. Box 691226, San Antonio, Tex. 78269

[21] Appl. No.: 168,051

[22] Filed: Dec. 15, 1993

[51] Int. Cl.$^6$ .................................. B65D 85/38
[52] U.S. Cl. ......................... 206/320; 206/576; 190/9; 190/11; 190/107; 190/900
[58] Field of Search .............. 206/305, 320, 576; 364/705.01, 708; 346/145; 190/9, 10, 11, 107, 109, 110, 111, 900

[56] References Cited

U.S. PATENT DOCUMENTS

| | | | |
|---|---|---|---|
| 241,387 | 5/1881 | Loomis | 190/11 |
| 1,480,080 | 1/1924 | Kent | 190/10 |
| 2,755,156 | 7/1956 | Nichols | 190/11 |
| 4,658,956 | 4/1987 | Takeda et al. | |
| 4,738,340 | 4/1988 | Crespi | 190/109 X |
| 4,790,431 | 12/1988 | Reel et al. | |
| 4,896,776 | 1/1990 | Kabanuk et al. | |
| 5,163,560 | 11/1992 | Parrish, Jr. et al. | 206/320 X |
| 5,177,665 | 1/1993 | Frank et al. | |
| 5,214,574 | 5/1993 | Chang | 206/320 X |
| 5,226,540 | 7/1993 | Bradbury | 206/320 X |
| 5,242,056 | 9/1993 | Zia et al. | 206/576 |

OTHER PUBLICATIONS

Exhibit A is a single sheet flyer describing a "Samsonite" Laptop Computer Case.
Exhibit B is a four-page ircular describing a P.A.C.E. carrying case designed to protect a computer.
Exhibit C is a two-page flyer describing a TELCON laptop printer with a case.
Exhibit D is a two-page flyer from TENBA Computer Travelers describing a carrying case for a computer and its accessories.
Exhibit E is a two-page flyer describing a Gamber–Johnson mobile phone mount and mounts for laptop computers.
Exhibit F is four pages from the May 1991 "Laptop'-'magazine which describes a Targus Universal Notebook Case, a Canon "Bubble Jet Printer" with carrying case and a Computer Coverup, Inc. carrying case for a laptop computer.
Exhibit G is a one-page advertisement showing a mobile office known as the "Galazia".

*Primary Examiner*—Jacob K. Ackun
*Attorney, Agent, or Firm*—Gunn, Lee & Miller

[57] ABSTRACT

A carrying case (10) for electronic components such as a lap top computer, printer, CD ROM, and the like, the case (10) having a first shell half (14) and a second shell half (16) connected along a hinged edge. The first shell half (14) has shelves (20) and (22) foldable from a stowed position laying parallel to the plane of the first shell (14) to a use position in a plane perpendicular thereto, the shelves (20) and (22) lockable in said use position.

18 Claims, 4 Drawing Sheets

CARRYING CASE FOR ELECTRONIC COMPONENTS

FIELD OF THE INVENTION

Computer carrying cases, more particularly a computer carrying case with a fold down shelf that provides support for the computer carrying case when open and standing on a flat surface.

BACKGROUND

The revolution in computers has resulted in the miniaturization of components. Now, computers such as notebook-sized computers with fold-out monitors are able to be carried in a small briefcase. This reduction in size has opened up a new market. For example, salesmen can now go into the field with a huge inventory of samples and order forms capable of being called up from the memory of a notebook-sized computer or auxiliary storage device like CD ROM and displayed on the monitor. For a second example, carpet or tile salesmen may go to a job and be able to calculate square footage, and prices for a number of different items, right in the consumer's work place or home with the use of the appropriate program and storage data. Insurance adjusters may now take computers out to the scene of the property or automobile damage, call up the appropriate electronic forms, and input data directly into stored form, without creating a hard copy. In addition, much programmed information can be provided in the form of additional related documents that heretofore would fill a large filing cabinet.

Notwithstanding the sometimes remarkable evolution of the electronic components towards miniaturization, there has been a singular lack of related development in the field of carrying containers for the small, often delicate, electronic units and related peripherals such as CD ROMS, printers, modems and the like. This is especially true in the view of the new and vast market created by such miniaturization. For example, the typical carrying case for the notebook computers and related peripherals is a soft-sided (often leather) container. While one can appreciate the aesthetic qualities of such cases, the environment in which they are carried or transported, often by salesmen or insurance adjusters,—the equipment bouncing around the back seat or the trunk of a car or out on a field site,—leaves much to be desired in protection of the delicate electrical components. Further, the components are not interconnected.

Even such hard cases that are presently available are no more than glorified camera cases. They will typically have blocks of foam inside a hard shell. The foam may be cut out to fit a computer and its peripheral components. While such hard-sided cases afford protection not available with the soft-sided cases, they still leave much to be desired. Specifically, such cases fall short in that they do not allow the user the capability of organizing and interconnecting the various computer components such as the computer notebook and a printer. That is, the presently available hard cases typically require the user to connect up the various computer components after opening up the case, removal and before use.

A need presently exists for a hard case for carrying computer related components which also allows some organization of the components. Essentially, a need exists for what amounts to a "portable desk" within a hard-sided carrying case. Typically a worker sitting at his desk would have his computer hooked up to peripherals such as printers, modems, CD ROMS and the like. What is needed is a hard-sided carrying case that will provide compartments and shelves onto which the components could be placed such that upon opening the case, a very minimum amount of work is required before the user can begin operating his work station. Quite simply, a portable desk.

Thus, it is the object of the present invention to provide for a hard-sided computer carrying case which provides support for and storage compartments for a small computer, such as notebook-size computer and related, interconnected peripherals.

It is an additional object of the present invention to provide for a hard-sided computer carrying case which has options allowing the case to be either carried or rolled along.

It is an additional object of the present invention to provide for a hard-sided computer carrying case for carrying computers and related components which will provide support surfaces for the computer and related components which are retractable or foldable within the case, while additionally providing support surfaces, allowing the user to operate a computer keyboard while it is attached to the case.

It is an additional object of the present invention to provide for a carrying case for a computer and related components that can be used on a desk or at a table as a work station, may be stood up vertically to be used by persons sitting as a desk, or can be used by a person standing, wherein all three positions provide convenient access to the computer keyboard and interconnect with related peripherals.

This and other of objects are provided for in a carrying case for electronic components such as lap top computer, printer, CD ROM and the like, the case having a first shell half and a second shell half connected along hinged edges. One shell half has contained within it one or more shelves foldable from a stored position laying parallel to the plane of the shells to a use position perpendicular thereto, the shelf lockable in the use position and assisting in maintaining the balance of the carrying case when the two shell halves are open with respect one to the other.

The carrying case may also have wheels and an extendable handle for pulling the closed case along the floor. Further, the carrying case extendable handle is provided with a removable support shelf on which to place a keyboard or pen pad for pen based computing applications, allowing the user to sit or stand at the support shelf while computing.

SUMMARY OF THE INVENTION

The invention provides a carrying case having a first shell, being generally rectangular and having a bottom surface, and a second shell, similarly shaped. The shells are pivotally connected one to the other, and either one of the two shells has attached a first shelf which is foldable between a closed position, the closed position in which the first shelf is generally parallel to the bottom wall, and an open position in which the first shelf is generally perpendicular to the open wall and lays in such a position as to provide support for the carrying case when the shelves are open and the shelf is folded down.

DETAILED DESCRIPTION OF THE PREFERRED EMBODIMENTS

Figure 1:
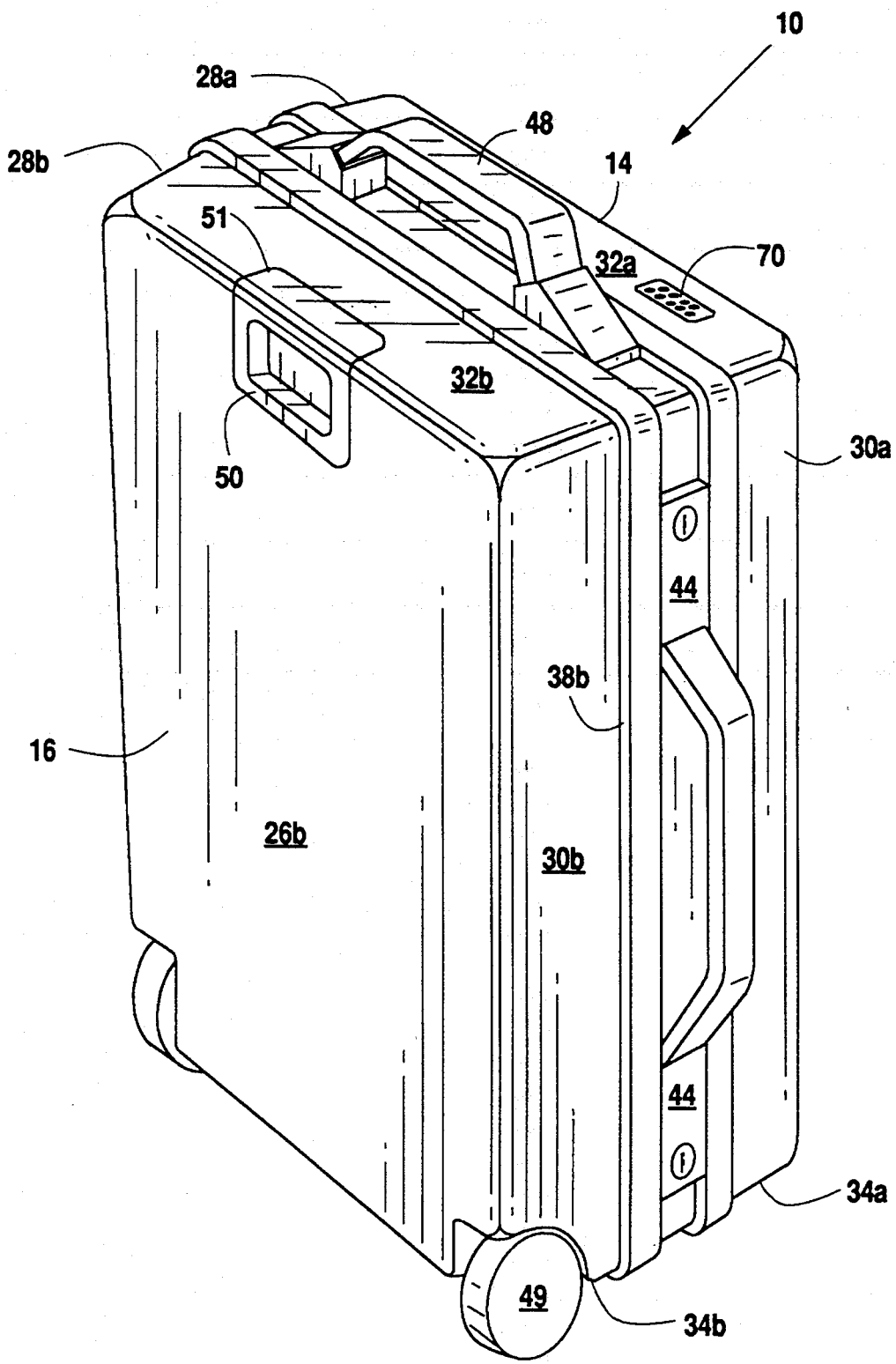
FIG. 1 is an isometric view of the exterior of applicant's carrying case.

Applicant's case (10) is comprised of container (12) having a first shell (14) and a second shell (16), both shells being generally rectangular. FIG. 1 illustrates first shell (14) and second shell (16) attached by hinge means (18) along adjacent sides thereof. The interior of case (10) is comprised of a first shelf (20) and a second shelf (22) rotatably attached to the interior of first shell (14) such that shelves (20) and (22) can rotate between a closed position with the shelves lying substantially in the plane of the bottom surface of first shell (14) to an open position substantially perpendicular thereto (see FIG. 3). On the interior of second shell (16) is rotatably attached a divider door (24) providing access to a compartment for locating computer accessory items. First shelf (20) and second shelf (22) provide support for a notebook computer with its built-in monitor and an accessory device such as a printer, fax machine, modem or the like, when case (10) is in an open position and shelves (20) and (22) are folded down. Components are releasably attached to shelves (20) and (22) such that the shelves may be rotated to their closed positions without having the components fall off.

Figure 2:
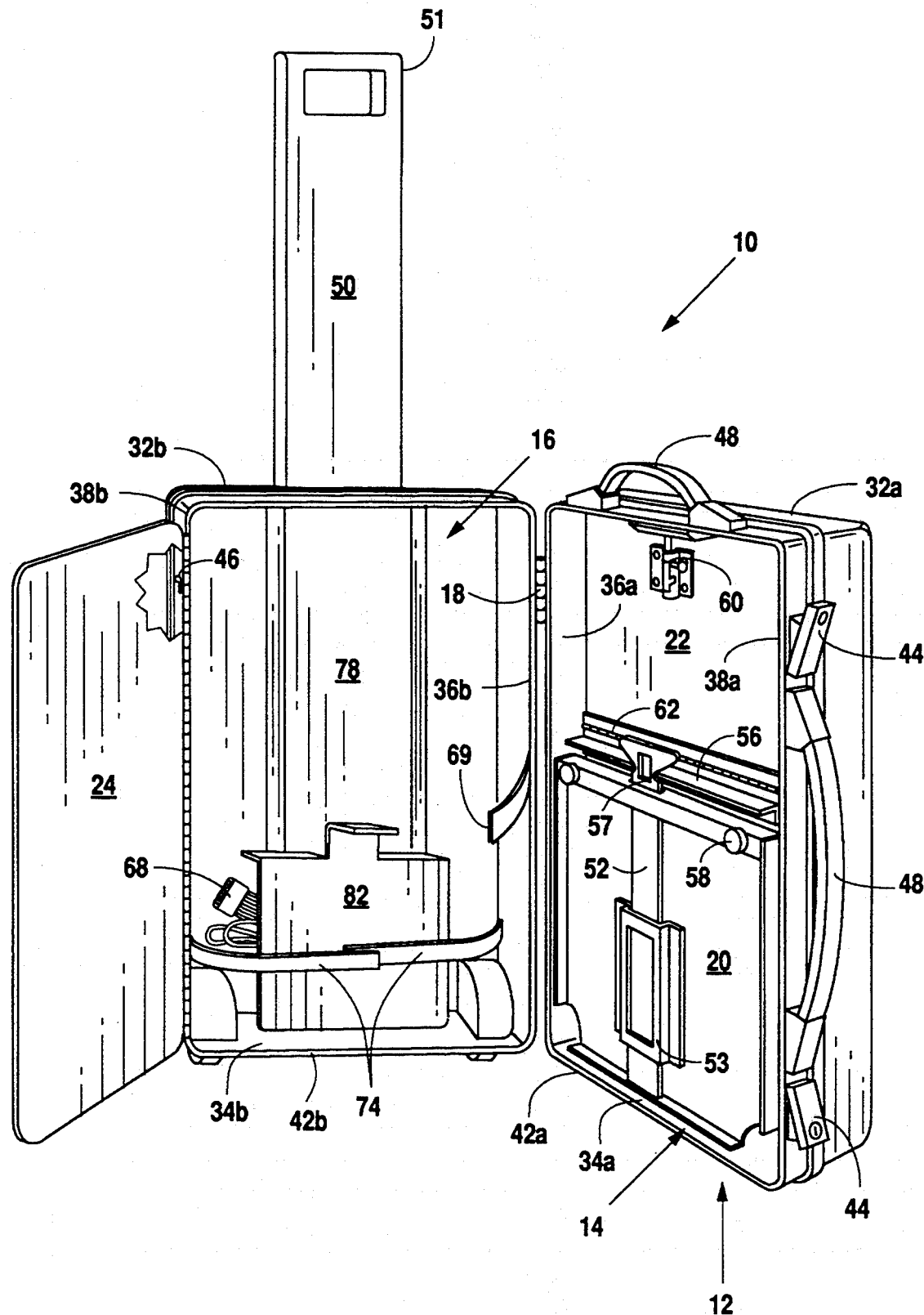
FIG. 2 is an isometric view of applicant's carrying case in an open position with the handle extended therefrom and the shelves in a folded-up position, and with the divider door open.
Figure 3:
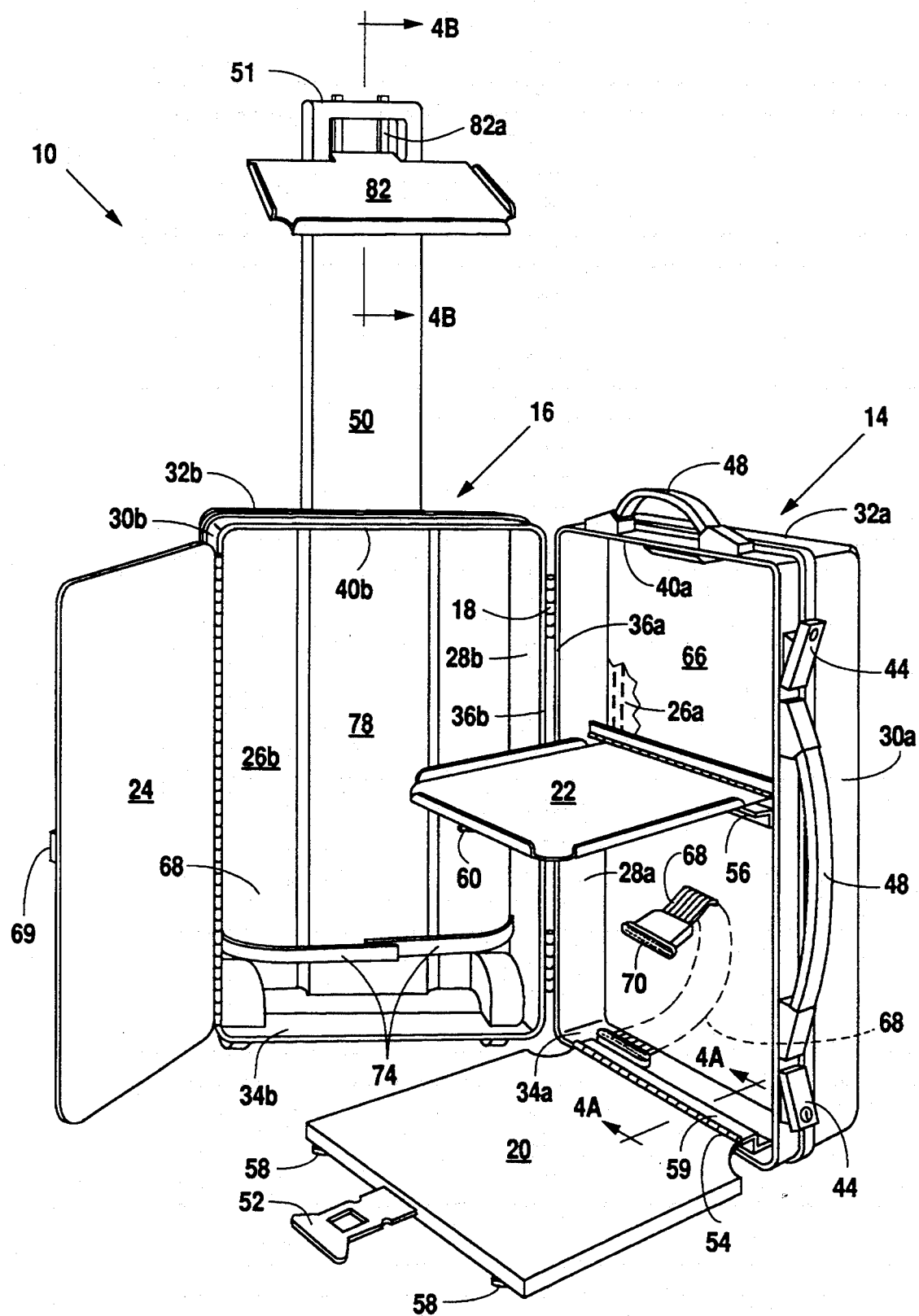
FIG. 3 is an isometric view of the carrying case of applicant's invention, in an open position, with the shelves folded down and the handle extended and supporting a removable member thereon.

Turning now in more detail and with reference to FIGS. 1, 2 and 3, shells (14) and (16), are generally rectangular with a bottom surface (26a) of first shell (14) and (26b) of second shell (16) opposite the shell opening. Perpendicular to bottom surfaces (26a) and (26b) are near side walls (28a) and (28b), far side walls (30a) and (30b), top end walls (32a) and (32b), bottom end walls (34a) and (34b). Thus, the bottom surface with its perpendicular walls forms a typical shell such as is found in many suitcases.

Shells (14) and (16) are typically made of hard plastic or aluminum or other sturdy, durable and shock resistant material. The walls of shells (14) and (16) terminate at a perimeter defined by near edge (36a) and (36b) (see FIG. 1), far edge (38a) and (38b), top edge (40a) and (40b) and bottom edge (42a) and (42b).

It is seen then, how shells (14) and (16) are attached by hinge means (18) along edges (38a) and (38b). Latch means (44) on first shell (14) is designed to engage a typical hook located on edge (36b) of second shell (16) in a manner well known in the art. It is also noted that stationery-handles (48) such as those found along edge (40a) and edge (36a) of first shell (14) provide the user a means of carrying case (10) from one of two positions. In addition, case (10) may be rolled along on wheels (49) (see FIG. 1) by extending extensible handle (50) and grasping grip portion (51) thereof.

Turning now to an examination of the interior of container (12) and with reference to FIGS. 2 and 3, it is noted that container (12) may be opened or closed in typical suitcase fashion by pivoting shells (14) and (16) along hinge means (18). It is further seen that first shelf (20) may be positionally engaged from an open to a closed position by use of a locking bar (52) slidably mounted along the outer surface of shelf (20) in guide means (53). First shelf (20) articulates from a closed or folded position in which it lies substantially in the plane of bottom surface (26a) to an open or use position which is perpendicular to the closed position, by pivoting along hinge (54). The open position provides the worker with a handy support member on upper surface of shelf (20) on which to place a computer or the like. Further, first shelf (20) acts as "third leg" to support the open case when first shelf (20) is locked in the down or use position and case (10) is placed vertically as illustrated in FIG. 3. It is seen that locking bar (52) movable along guide means (53) is slidable through support bar (56) at a notch (57) (see also FIG. 4C). This allows support bar (56) to maintain first shelf (20) in a closed position. User may slide locking bar (52) out of notch (57) which holds locking bar (52) in a disengaged or up position (see FIG. 2), and rotate first shelf (20) to a down or use position along hinge (54). Referring now to FIGS. 2, 3, 4A and 4C, it is seen that hinge (54) is integral with base bar (59) and has a slot (61) therethrough (see FIG. 4A). Slot (61) is centrally located and aligned with locking bar (52) such that the removed end of locking bar (52) may slide through base bar (59) at slot (61). When removed end of locking bar (52) is urged through slot (61), it engages a wedge (63). Locking bar (52) is typically made of metal which has some resiliency and when locking bar (52) rides up on wedge (63), its surface is pressed tightly against the surface of base bar (59). The action of urging locking bar (52) through slot (61) and against wedge (63) then serves to maintain first shelf (20) in its open or use position perpendicular to bottom surface (26a). Another way of viewing it is that the action of locking bar (52) against wedge (63) maintains first shelf (20) in a position parallel to and extending from bottom end wall (34a).

Additional details, appreciated from FIGS. 1 through 4C, are feet (58), of which there are typically two, located at the removed corners of the underside of rectangular first shelf (20). Tabular shaped base bar (59) is provided vertically adjacent to bottom end wall (34a) near bottom edge (42a) thereof. Pivotally attached to the removed edge of base bar (59) is supporting hinge (54) which allows for shelf (20) to pivot freely between the folded or closed position and the open or use position.

Second shelf (22) pivots along a hinge (62), hinge (62) being mounted to support bar (56). Slidable latch (60) is provided along the top surface of second shelf (22) to maintain the second shelf in a closed position.

Turning now to the details of second shell (16), it is seen that second shell (16) is dimensioned generally rectangular and similar to that of first shell (14). It is noted that both first shell (14) and second shell (16) are provided with foam (66) for lining the interior thereof to protect the sometimes delicate, electronic and computer related components which are designed to be carried in case (10) (FIGS. 2 and 3 show the foam removed except for the upper compartment of shell (14) in FIG. 3, for the purposes of illustrating details which may otherwise be covered by foam (66)). Divider door (24) is provided with a closure means such as a hook and pile strap system (69) illustrated in FIGS. 2 and 3.

Other useful items provided with case (10) include: Power cords, connector cables (68) and junction boxes (70). The latter may sometimes provide electronic communication between devices within container (12) and those outside of the container. Hold down straps (74) are also provided within the auxiliary component compartment defined by divider door (24) of second shell (16).

Note also in FIG. Z how second shell (16) has molded therein extensible handle compartment (78) for housing retractable, extensible handle (50). Extensible handle (50), when in the removed position as indicated in FIG. 3, can be seen to be have extensible handle grip (51) at the removed end thereof, the grip capable of providing support to removable member (82). In this fashion, removable member (82) may be stored within the auxiliary compartment and removed for engagement with extensible handle (50) in a manner illustrated in FIGS. 3 and 4B. This will provide a suitable base for a worker in the field to place a computer for use while seated or standing, the computer hooked up by connector cable (68) through junction box (70) to components within container (12). FIG. 1 illustrates a junction box (70) which is capable of connecting electrical components by a power cord connected through the walls of case (10).

Figure 4A:
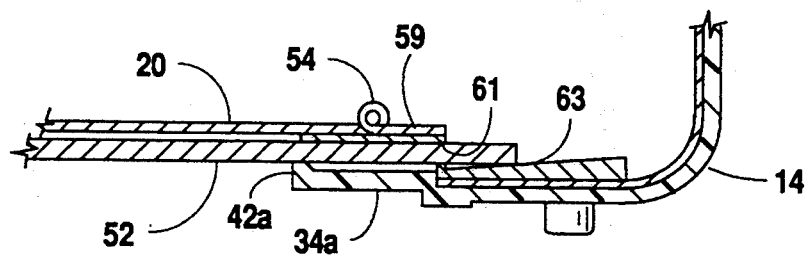
FIG. 4A is a cross-sectional view in elevation of details of the first shelf and the locking bar as they engage near edge 34a of the first shelf.
Figure 4C:
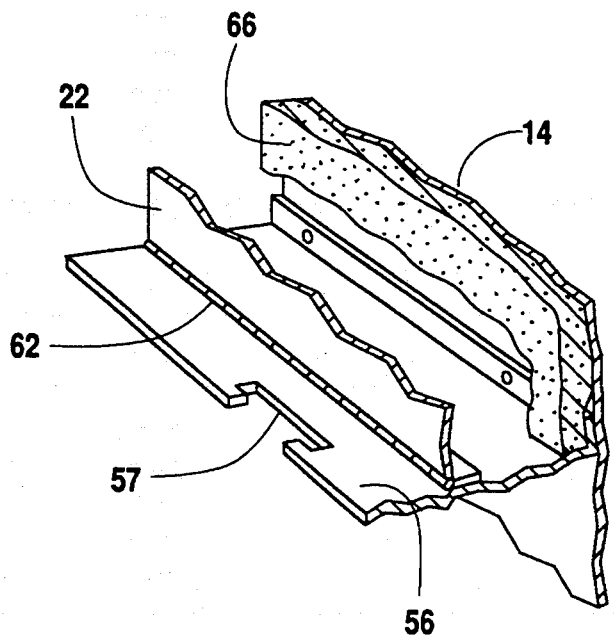
FIG. 4C is a cut-away view in perspective of details of the second shelf as it engages the first shell.
Figure 4B:
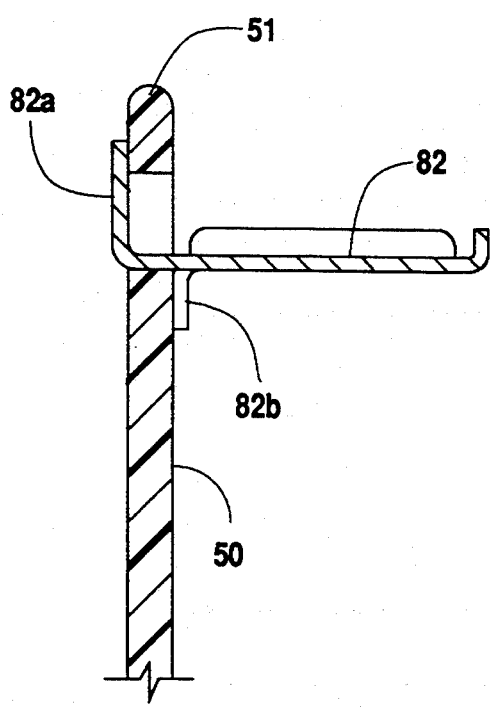
FIG. 4B is a cut-away view in side elevation showing details of the manner in which removable member 82 engages the handle.

FIG. 4B illustrates how removable member (82) having lips (82a) and (82b) engage handle (50) and grip (51) to allow member (82) to stay suspended from handle (50).

The use of the portable carrying case described herein allows computers and accessories (printer, CD ROM, fax machine, etc.) to be assembled and "ready to go." Moreover, using the two-wheeled version with the extendable handles increases the carrying load capability, thereby allowing more components such as digitizing camera, laser quality printer, cellular phone, paper, manuals, tools and the like to be carried. The storage compartment of the carrying case may be used to house AC/DC convertors, machine cord, AC power cord, tools and some accessories.

Typically, though not necessarily, the lower hinged shelf is designed to carry the computer or other components. Also, the computer shelf acts as a "third leg" to help stabilize the open carrying case as it rests in a vertical position on a flat surface. The upper hinged shelf is typically used for accessories such as a printer, fax machine, cellular phone, CD ROM or other device. The frame is constructed of cold rolled steel. The components attach to the shelves with releasable hook and loop fasteners. Convoluted foam backing protects the fragile electronic components. An optional paper storage compartment may be mounted on the divider door. Both, the hinged computer compartment and the hinged accessory compartments dimensions are approximately 9½"×11½"×2½". This will allow most notebook class computers to fit in it. In addition, the hinged accessory compartment dimensions are suitable for most cut sheet printers, CD ROMs, cellular phones, fax machines, scanners, etc.

Thus, applicant provides unique, free-standing computer and accessory portable desk for use on a flat surface while sitting at a chair or standing up. Used as a portable desk, the unique carrying case of applicant's present invention provides a work place for use in warehouses, machine shops or the like with an optional handle mount for holding test equipment or computers. For example, the present system is particularly adaptable for use with pen-based computer operations, like taking inventory, etc.

Terms such as "left", "right", "Up", "down", "bottom", "top", "front", "back", "in", "out" and the like are applicable to the embodiment shown and described in conjunction with the drawings. These terms are merely for the purposes of description and do not necessarily apply to the position or manner in which the invention may be constructed or used.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

I claim:

1. A carrying case for electronic components, the carrying case comprising a container having:
   a first shell, the first shell being generally rectangular and having a bottom surface, a near side wall and removed side wall, an upper wall and a lower wall, the walls being generally perpendicular to the bottom surface and defining an interior of said first shell and terminating at the edges defining a perimeter of said first shell;
   a second shell, the second shell being generally rectangular and having a bottom surface, a near side wall and removed wide wall, an upper wall, and a lower wall, the walls being generally perpendicular to the bottom surface and defining an interior of said second shell and terminating at edges defining a perimeter of said second shell;
   means pivotally connecting said first shell to said second shell along the near side wall edges of each of said shells, such that the container may be movable between a closed position with the perimeters of said shells in contact, to an open position, with the perimeters of said shells spaced apart;
   a first shelf attached to the interior of said first shell and foldable between a closed position parallel to the bottom surface of said first shell to a use position perpendicular to the bottom surface of said first shell, said use position being generally coincident with the plane of the lower wall of said first shell; and
   lock means to selectively maintain said first shelf in either of the use position or the closed position, while said container is in the open position,
   wherein said container may be placed in an open position and laid on a flat surface with the lower end walls of said shells and said first shelf, locked in said use position providing support therefor, with said first shelf further providing support for electronic components.

2. The carrying case of claim 1, wherein said second shell comprises:
   wheels for supporting the carrying case on a flat surface;
   an extendable handle for pulling said carrying case on the wheels; and shelf means engageable with said handle for supporting electronic equipment thereon.

3. The carrying case of claim 1 further comprising a second shelf, said second shelf rotatably mounted to said first shell and movable from a stowed position wherein said second shelf is parallel to the bottom surface of said first shell and a use position wherein said second shelf is perpendicular to the bottom surface of said first shell, said second shelf for supporting electronic components thereon.

4. The carrying case of claim 1 further comprising a door, said door articulably mounted to the walls of said second shell and moveable between a closed position parallel to the bottom surface of said second shell and an open position wherein the door is in non-parallel relation to the bottom surface of said second shell.

5. The carrying case of claim 1, wherein said second shell comprises:
wheels for supporting the carrying case on a flat surface;
an extendable handle for pulling said carrying case on the wheels; and
shelf means removably engageable with said handle for supporting electronic equipment thereon;
a second shelf, said second shelf rotatably mounted to said first shell and movable from a stowed position wherein said second shelf is parallel to the bottom surface of said first shell and a use position where said second shelf is perpendicular to the bottom surface of said first shell, said second shelf supporting electronic components thereon.

6. The carrying case of claim 1 further comprising:
a second shelf, said second shelf rotatably mounted to said first shell and movable from a stowed position wherein said second shelf is parallel to the bottom surface of said first shell and a use position where said second shelf is perpendicular to the bottom surface of said first shell, said second shelf supporting electronic components thereon; and
a door, said door articulably mounted to the walls of said second shell and moveable between a closed position parallel to the bottom surface of said second shell and an open position wherein the door is in non-parallel relation to the bottom surface of said second shell.

7. The carrying case of claim 1, wherein said second shell comprises:
wheels for supporting the carrying case on a flat surface;
an extendable handle for pulling said carrying case on the wheels;
shelf means engageable with said handle for supporting electronic equipment thereon; and
a door, articulably mounted to the walls of said second shell and moveable between a closed position parallel to the bottom surface of said second shell and an open position wherein the door is in non-parallel relation to the bottom surface of said second shell.

8. The carrying case of claim 1, wherein said second shell comprises:
wheels for supporting the carrying case on a flat surface;
an extendable handle for pulling said carrying case on the wheels; and
shelf means engageable with said handle for supporting electronic equipment thereon;
a second shelf, said second shelf rotatably mounted to said first shell and movable from a stowed position wherein said second shelf is parallel to the bottom surface of said first shell and a use position where said second shelf is perpendicular to the bottom surface of said first shell, said second shelf supporting electronic components thereon; and
a door, articulably mounted to the walls of said second shell and moveable between a closed position parallel to the bottom surface of said second shell and an open position wherein the door is in non-parallel relation to the bottom surface of said second shell.

9. The carrying case of claim 1 wherein said lock means comprises a sliding bar slidably mounted to the bottom surface of said first shelf and engageable with wedge means integral with the lower wall of said first shell to lockingly maintain said first shelf in a use position.

10. A carrying case for electronic components, the case comprising:
a generally rectangular first shell;
a generally rectangular second shell;
hinge means articulably mounting said first shell to said second shell allowing said shell to move between an open and a closed position;
a first shelf engageable with said first shell and foldable from a closed position to a use position wherein said first shelf is capable of providing support for said first and second shells on a flat surface and support for electronic components when in the use position and capable, in a closed position, of allowing storage of said shelf and the electronic components within said first shell when said shells are in the closed position;
lock means integral with said first shelf to selectively lock said first shelf in either of said closed or said open positions, wherein said lock means includes a bar slidably mounted to the bottom surface of said first shelf and engageable with wedge means integral with the first shell and capable of locking said first shelf in an open position.

11. The carrying case of claim 10 further comprising a second shelf, said second shelf totally mounted to said first shell and moveable between a stored position wherein said second shelf is parallel to said first shell and to a use position wherein said second shelf is perpendicular to said first shell, said second shelf for supporting computer components thereon.

12. The carrying case as described in claim 10 further comprising junction means integral with said first shell for allowing communication between electrical conducting cables within said first shell and the exterior thereof.

13. The carrying case as described in claim 12 further comprising a door, the door pivotally mounted to the walls of said second shell and moveable between a closed position parallel to the bottom of said second shell and an open position in non-parallel relation to said second shell, said door defining an auxiliary electrical component storage compartment within said second shell.

14. The carrying case as described in claim 13 further comprising an extensible handle moveable between a normally stored position within said second shell of said carrying case to an extendable position substantially removed from said second shell.

15. The carrying case as described in claim 14 further including support means engageable with a removed end of said extensible handle for mounting electrical components thereon.

16. The carrying case as described in claim 15 further comprising wheels mounted to said second shell for rollingly supporting the carrying case on a flat surface.

17. The carrying case as described in claim 16 further comprising a foam layer at least partially covering the inner surface of either of said first or said second shell.

18. The device as described in claim 17 further including means for removably affixing electronic components to the surface of said first and said second shelf.

* * * * *